(12) United States Patent
Nagakubo et al.

(10) Patent No.: US 11,240,725 B2
(45) Date of Patent: Feb. 1, 2022

(54) WIRELESS COMMUNICATION DEVICE, WIRELESS COMMUNICATION SYSTEM, WIRELESS COMMUNICATION METHOD, AND COMPUTER PROGRAM PRODUCT

(71) Applicant: KABUSHIKI KAISHA TOSHIBA, Minato-ku (JP)

(72) Inventors: Sakie Nagakubo, Kawasaki (JP); Ren Sakata, Yokohama (JP); Hiroki Kudo, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 234 days.

(21) Appl. No.: 16/551,813

(22) Filed: Aug. 27, 2019

(65) Prior Publication Data

US 2020/0187079 A1 Jun. 11, 2020

(30) Foreign Application Priority Data

Dec. 6, 2018 (JP) .............................. JP2018-229233

(51) Int. Cl.
*H04W 36/30* (2009.01)
*H04W 36/08* (2009.01)

(52) U.S. Cl.
CPC ........... *H04W 36/30* (2013.01); *H04W 36/08* (2013.01)

(58) Field of Classification Search
CPC ... H04W 36/30; H04W 36/08; H04W 36/305; H04W 36/0079; H04W 36/0055; H04W 36/0058; H04W 36/0069; H04W 36/0005; H04W 36/0007; H04W 36/0009; H04W 8/186; H04W 4/08; H04W 36/10; H04W 36/12; H04W 36/36; H04W 40/02; H04W 40/00; H04W 40/12; H04W 40/125; H04W 28/02; H04W 28/0231; H04W 72/1226;

(Continued)

(56) References Cited

U.S. PATENT DOCUMENTS

| 2014/0003263 A1* | 1/2014 | Sheriff .................. H04W 48/20 370/252 |
| 2016/0066319 A1 | 3/2016 | Sakata et al. |
| 2018/0098362 A1* | 4/2018 | Yamauchi ........... H04W 74/085 |

FOREIGN PATENT DOCUMENTS

| JP | 2004-297381 A | 10/2004 |
| JP | 2013-121011 A | 6/2013 |

(Continued)

*Primary Examiner* — Chi H Pham
*Assistant Examiner* — Ji-Hae Yea
(74) *Attorney, Agent, or Firm* — Oblon, McClelland, Maier & Neustadt, L.L.P.

(57) ABSTRACT

According to an embodiment, a wireless communication device includes a memory and one or more hardware processors coupled to the memory. The one or more hardware processors are configured to function as a communication control unit and a determination unit. The communication control unit transmits and receives data to and from a first wireless communication device. The determination unit calculates transmission and reception information based on a transmission and reception result of the data, and variation of received signal intensity of the data, and determines whether to maintain connection to the first wireless device based on the transmission and reception information and the variation. The communication control unit controls communication according to a determination result of the determination unit.

16 Claims, 9 Drawing Sheets

(58) Field of Classification Search
CPC ......... H04W 28/0289; H04W 28/0804; H04W
28/0823; H04W 28/0892; H04W 28/0908;
H04W 28/0917; H04W 28/0942; H04W
28/095; H04W 28/0958; H04W 36/0016;
H04W 36/0085; H04W 36/0088; H04W
40/18; H04W 40/24; H04W 40/248;
H04W 72/00; H04W 72/04; H04W
72/0486; H04W 72/06
See application file for complete search history.

(56) References Cited

FOREIGN PATENT DOCUMENTS

| | | | |
|---|---|---|---|
| JP | 2016-54349 | A | 4/2016 |
| JP | 2018-19169 | A | 2/2018 |
| JP | 2018-523334 | A | 8/2018 |
| JP | 2018-182434 | A | 11/2018 |
| JP | 2019-121899 | | 7/2019 |

* cited by examiner

WIRELESS COMMUNICATION DEVICE, WIRELESS COMMUNICATION SYSTEM, WIRELESS COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2018-229233, filed on Dec. 6, 2018; the entire contents of which are incorporated herein by reference.

FIELD

Embodiments described herein relate generally to a wireless communication device, a wireless communication system, a wireless communication method, and a computer program product.

BACKGROUND

A multi-hop network in which data transmitted from a wireless communication device is transmitted to an aggregation device, when the surrounding wireless communication devices receive and resend the data, has been conventionally known. Depending on the magnitude of time variation of the propagation path, the multi-hop network includes a path the communication quality of which is likely to recover even when a communication failure occurs, and a path the communication quality of which does not recover in the long term.

DETAILED DESCRIPTION

Figure 1:
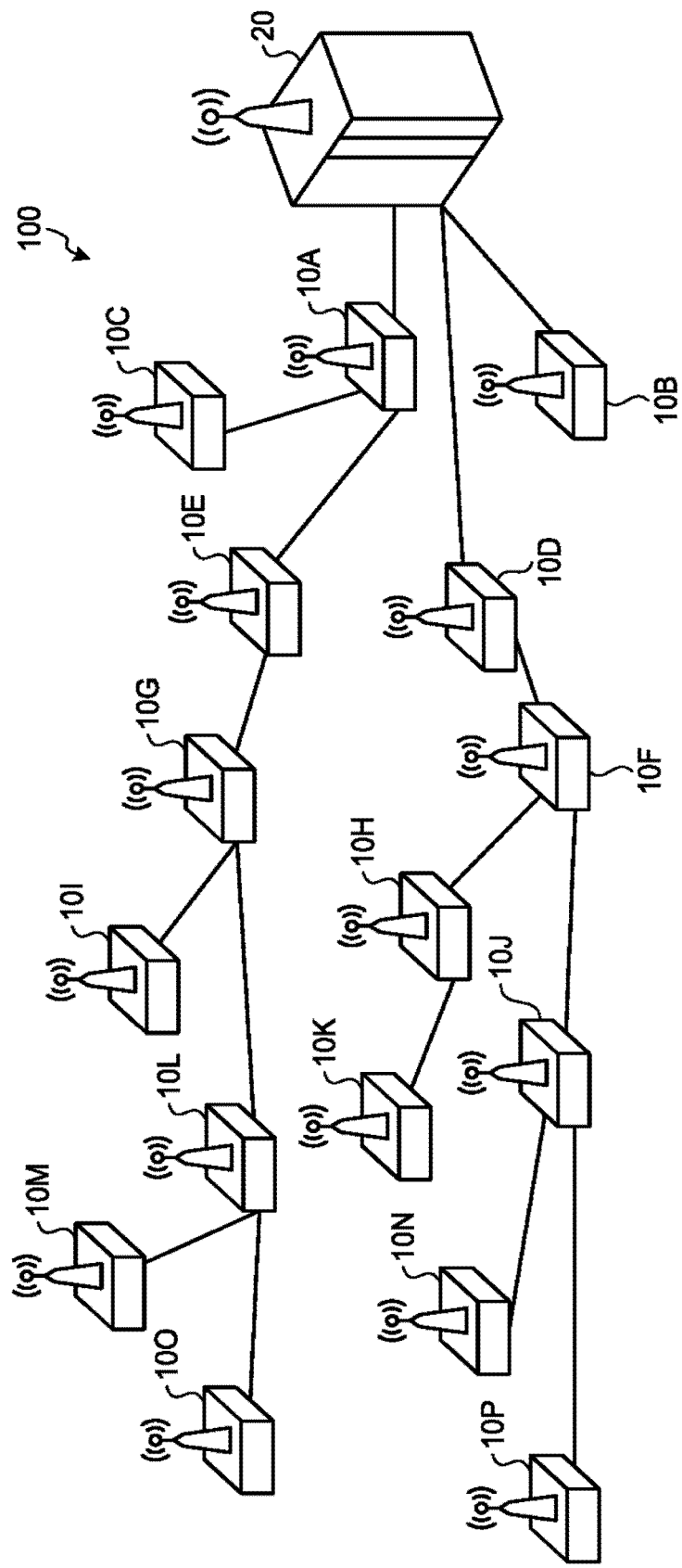
FIG. 1 is a diagram illustrating an example of a device configuration of a wireless communication system in a first embodiment.

According to an embodiment, a wireless communication device includes a memory and one or more hardware processors coupled to the memory. The one or more hardware processors are configured to function as a communication control unit and a determination unit. The communication control unit transmits and receives data to and from a first wireless communication device. The determination unit calculates transmission and reception information based on a transmission and reception result of the data, and variation of received signal intensity of the data, and determines whether to maintain connection to the first wireless device based on the transmission and reception information and the variation. The communication control unit controls communication according to a determination result of the determination unit.

When the communication quality with a connection destination is deteriorated and a communication failure has occurred, it is possible to select a connection destination with good communication quality, by performing a search process for switching a connection destination, and switching the connection destination. However, in a path in which time variation is large and that often repeats failed communication and successful communication, the number of searching times is increased. Consequently, the consumption power will be reduced. In contrast, instead of performing the search process, when data is to be resent to the connection destination that has been connected, the data can be successfully transmitted in a path that often repeats successful and failed communications. However, in an environment in which the communication quality does not recover in the long term, resending process is unnecessarily continued, and it takes a long time to connect to a connection destination to which data can be transmitted. Consequently, the data collection rate and the battery life will be reduced.

Moreover, it is possible to switch the connection destination on the basis of throughput and maintain the connection to a connection destination to which a sufficient amount of data can be transmitted. However, when the time variation of the propagation path is small and the received signal intensity is gradually reduced, the communication quality is good until just before the long-term communication failure occurs. Consequently, it takes a long time to determine the deterioration of throughput. As a result, the long-term data communication failure occurs, and the data collection rate will be reduced.

For example, a wireless communication device of the following embodiments determines to maintain and switch connection to and from a connection destination, by taking into consideration the characteristics of the time variation of the propagation path, on the basis of the past received signal intensity. Consequently, the wireless communication device can maintain and switch connection in a more suitable manner, in an environment with different propagation paths.

Hereinafter, embodiments of a wireless communication device, a wireless communication system, a wireless communication method, and a computer program product will be described in detail with reference to the accompanying drawings.

First Embodiment

First, a device configuration of a wireless communication system of a first embodiment will be described.

Example of Device Configuration

FIG. 1 is a diagram illustrating an example of a device configuration of a wireless communication system 100 in a first embodiment. The wireless communication system 100 in the first embodiment includes wireless communication devices 10A to 10P, and an aggregation device 20. Hereinafter, when the wireless communication devices 10A to 10P are not to be differentiated, the wireless communication devices 10A to 10P are simply referred to as wireless communication devices 10.

In the wireless communication system 100, the wireless communication devices 10 and the aggregation device 20 disposed within a predetermined range can perform wireless communication with one another. Data transmitted from each of the wireless communication devices 10 is transmitted to the aggregation device 20 via the other wireless communication device 10 or directly. The aggregation device 20 aggregates data transmitted from the wireless communication devices 10. It is to be noted that a difference in the propagation path environment may be a difference in the entire wireless communication system 100 or a partial difference. For example, when a difference in the propagation path environment is determined by the entire wireless communication system 100, the difference in the propagation path environment is a difference in the installation environment (for example, wood, river, city area, and the like) of the entire wireless communication system 100. For example, when a difference in the propagation path environment is determined partially, the difference in the propagation path environment is a difference in the installation environment of each wireless communication device 10.

Figure 2:
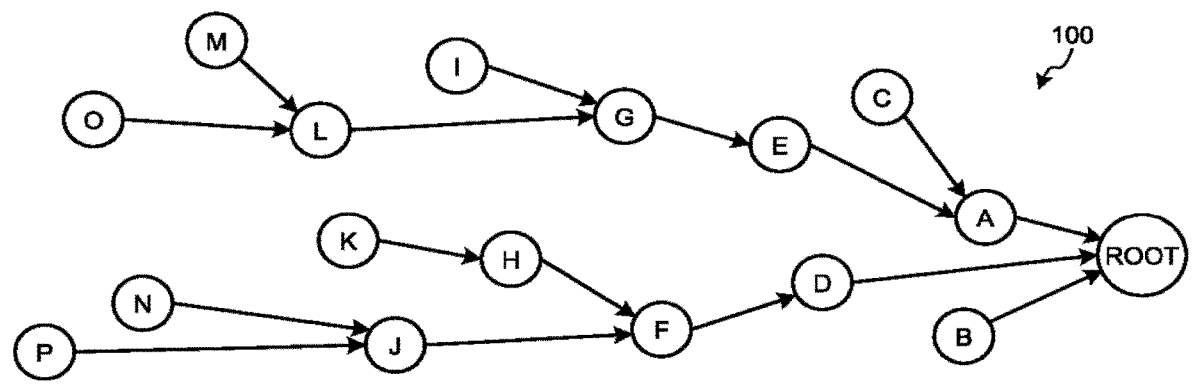
FIG. 2 is a schematic diagram illustrating the wireless communication system in FIG. 1 in the form of network topology.

FIG. 2 is a schematic diagram illustrating the wireless communication system 100 in FIG. 1 in the form of network topology. The alphabets indicate the wireless communication devices 10 (wireless nodes), and the root indicates the aggregation device 20 (root node). Moreover, the arrows indicate the propagation paths for data. The origin of the arrows indicates the transmission source (child node) of data, and the tip of the arrows indicates the transmission destination (parent node) of data. The number of hops of a parent node is smaller than that of its child node by one. The parent node is the transmission destination node of the child node. The number of hops of a child node is greater than that of its parent node by one. The child node is a node that has determined its parent node to be the transmission destination node.

It is to be noted that the communication method of the wireless communication system 100 is optional. For example, the wireless communication system 100 in the first embodiment is a multi-hop network.

Next, a functional configuration of the wireless communication device 10 in the first embodiment will be described.

Example of Functional Configuration

Figure 3:
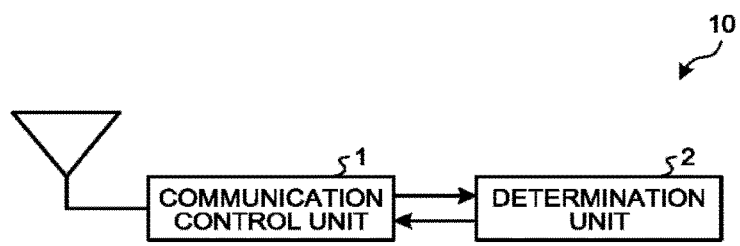
FIG. 3 is a diagram illustrating an example of a functional configuration of a wireless communication device in the first embodiment.

FIG. 3 is a diagram illustrating an example of a functional configuration of the wireless communication device 10 in the first embodiment. The wireless communication device 10 in the first embodiment includes a communication control unit 1 and a determination unit 2.

The communication control unit 1 transmits and receives data to and from a connection destination (first wireless communication device). The communication control unit 1 controls communication according to the determination result of the determination unit 2.

The determination unit 2 calculates transmission and reception information on the basis of the transmission and reception result of data, variation of the received signal intensity of data, and the inclination of a straight line that approximates the transition of the received signal intensity. Then, on the basis of the transmission and reception information and the variation, the determination unit 2 determines whether to maintain the connection to the connection destination. Details of the transmission and reception information will be described below.

Example of Operation Method

Figure 4:
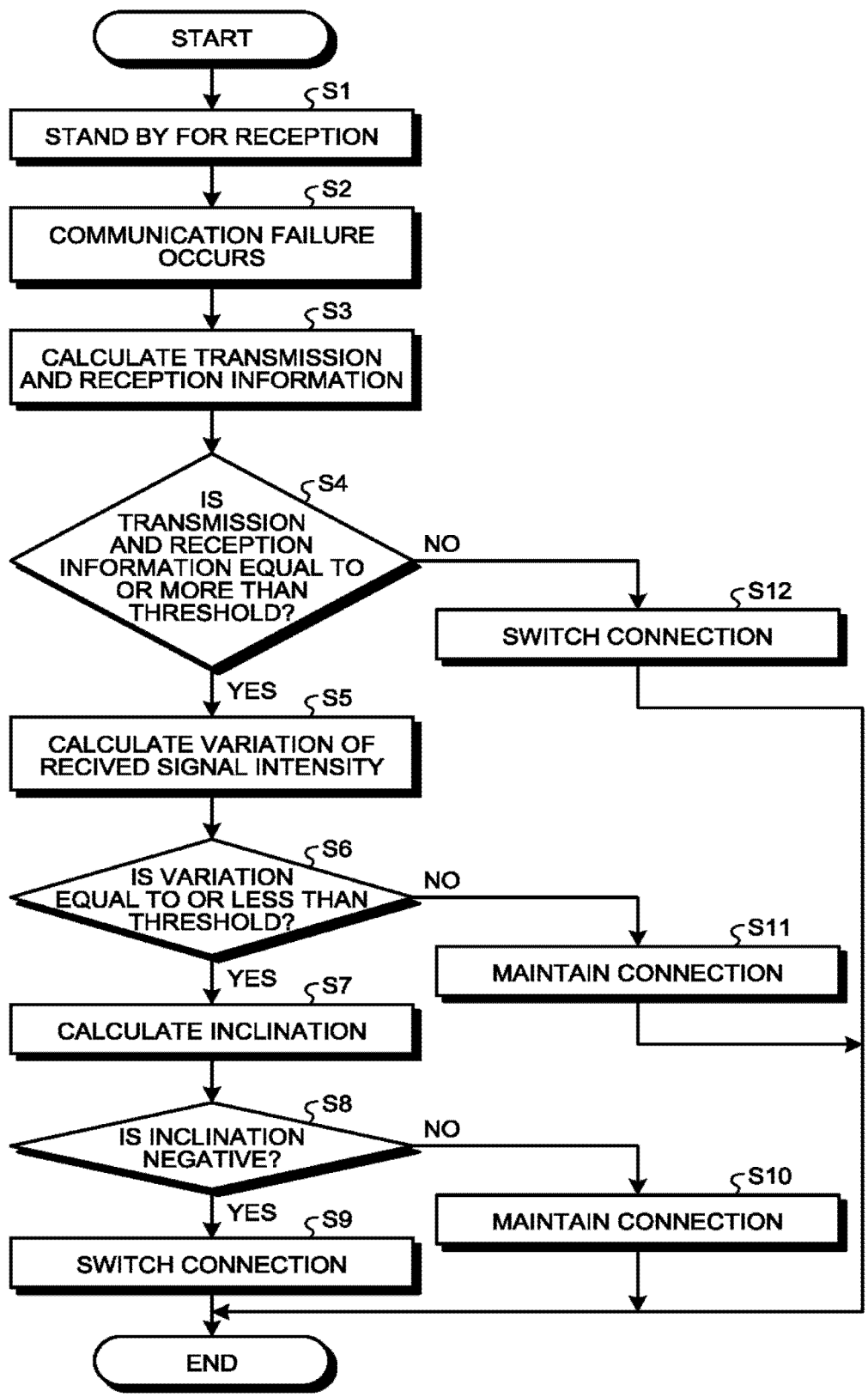
FIG. 4 is a flowchart illustrating an example of an operation method of the wireless communication device in the first embodiment.

FIG. 4 is a flowchart illustrating an example of an operation method of the wireless communication device 10 in the first embodiment. The communication control unit 1 stands by for data to be transmitted from the connection destination (step S1). For example, the connection destination is the aggregation device 20, the parent node of the wireless communication device 10, and the child node of the wireless communication device 10.

Next, when a communication failure with the connection destination occurs in the communication control unit 1 (step S2), the determination unit 2 calculates the transmission and reception information on the basis of data transmitted and received within a predetermined period (step S3).

The transmission and reception information includes at least one of the number of times data is received, a reception success rate of data, a reception amount of data, the number of times data is transmitted, a transmission success rate of data, a transmission amount of data, and throughput of connection to the connection destination. The reception success rate of data is a value obtained by dividing the number of times the data reception was successful by the number of times data reception was attempted. The transmission success rate of data is obtained by dividing the number of times the transmission was successful to the connection destination by the number of times data transmission was attempted. It is to be noted that the transmission and reception information may also be calculated when communication is successful.

Next, an example of the predetermined period at step S3 described above will be explained.

For example, the predetermined period is a resending upper limit period of the wireless communication device 10 (a period during which the wireless communication device 10 can continue resending data to be transmitted, from when the data is generated).

Moreover, for example, the predetermined period is a period until a buffer overflow occurs in the wireless communication device 10 (a period until a data overflow occurs, when data to be transmitted is accumulated in the buffer that holds the data to be transmitted in the wireless communication device 10, at every communication cycle).

Furthermore, for example, the predetermined period is a remaining resending period of data that is closest to the resending upper limit period of the wireless communication device 10 (in the data to be transmitted held in the wireless communication device, a period until the data that has continued to be resent for the longest time reaches the resending upper limit period).

Still furthermore, for example, the predetermined period is a transmission period required for transmitting the data closest to the resending upper limit period held in the wireless communication device 10 (in the data to be transmitted held in the wireless communication device 10, a period obtained by multiplying the number of communication times required for transmitting the data that has continued to be resent for the longest time, by the communication cycle).

Still furthermore, for example, the predetermined period is a transmission period required for transmitting the entire data to be transmitted held in the wireless communication device 10 (a period obtained by multiplying the number of communication times required for transmitting the entire data to be transmitted held in the wireless communication device 10, by the communication cycle).

Still furthermore, for example, the predetermined period is a period obtained by subtracting the period in which the data transmitted to a connection destination from the wireless communication device 10 reaches the aggregation device 20, from the resending upper limit period described above.

Still furthermore, for example, the predetermined period is a period obtained by subtracting a period in which the data transmitted to a connection destination from the wireless communication device 10 reaches the aggregation device 20, from the period until the buffer overflow described above occurs.

Still furthermore, for example, the predetermined period is a period obtained by subtracting the period in which the data transmitted to a connection destination from the wireless communication device 10 reaches the aggregation device 20, from the remaining resending period described above.

Still furthermore, for example, the predetermined period is a period obtained by subtracting the period in which the data transmitted to a connection destination from the wireless communication device 10 reaches the aggregation device 20, from the transmission period required for transmitting the data closest to the resending upper limit period described above.

Still furthermore, for example, the predetermined period is a period obtained by subtracting the period in which the data transmitted to a connection destination from the wireless communication device 10 reaches the aggregation device 20, from the transmission period required for transmitting the entire data to be transmitted described above.

Still furthermore, for example, the predetermined period described above may be a combination of the predetermined periods described above.

Next, the determination unit 2 determines whether the transmission and reception information described above is equal to or more than a threshold (first threshold) (step S4).

For example, when the transmission and reception information is a reception amount or a transmission amount of data, the threshold used in the determination process at step S4 is a predetermined data amount. For example, the predetermined data amount is a data amount to be transmitted (received) by the wireless communication device 10. For example, the data amount to be transmitted (received) by the wireless communication device 10 is defined when the wireless communication system 100 (wireless communication device 10) is designed or the like.

Moreover, for example, when the transmission and reception information is the number of times data is received or the number of times data is transmitted, the threshold used in the determination process at step S4 is a predetermined number of times of transmission (reception). For example, the predetermined number of times of transmission (reception) is the number of times the wireless communication device 10 needs to transmit (receive). For example, the number of times the wireless communication device 10 needs to transmit (receive) is defined when the wireless communication system 100 (wireless communication device 10) is designed or the like.

Furthermore, for example, when the transmission and reception information is the transmission success rate of data, the threshold used in the determination process at step S4 is a value obtained by dividing a predetermined number of times of transmission by the number of times of transmission until the resending upper limit is reached, a value obtained by dividing a predetermined number of times of transmission by the number of times of transmission until a buffer overflow occurs, and the like.

Still furthermore, for example, when the transmission and reception information is throughput of the connection to the connection destination, the threshold used in the determination process at step S4 is throughput required for transmitting the entire data amount to be transmitted held in the wireless communication device 10 in a predetermined transmission cycle.

When the transmission and reception information described above is less than the threshold (No at step S4), the determination unit 2 determines to switch the connection to the connection destination to connection to another connection destination (second wireless communication device) (step S12).

When the transmission and reception information described above is equal to or more than the threshold (Yes at step S4), the determination unit 2 calculates the variation of the received signal intensity (step S5). More specifically, the variation of the received signal intensity is a standard deviation that indicates a scattering degree of the received signal intensity, for example. Moreover, for example, the variation of the received signal intensity is the amplitude of received signal intensity and the like. Furthermore, for example, the variation of the received signal intensity may be dispersion of received signal intensity. Still furthermore, for example, an approximation formula (for example, a straight line formula) that approximates the transition (measured values) of the received signal intensity may be calculated first, and the variation of the received signal intensity may be a sum of squared errors of the approximation formula and the measured values.

Next, the determination unit 2 determines whether the variation of the received signal intensity is equal to or less than a threshold (second threshold) (step S6). For example, the threshold used in the determination process at step S6 is a value set in advance that is read when the wireless communication device 10 is activated (when power is turned ON). Moreover, for example, the threshold used in the determination process at step S6 is a value notified by the aggregation device 20.

When the variation of the received signal intensity is larger than the threshold (No at step S6), the determination unit 2 determines to maintain the connection to the connection destination (step S11).

When the variation of the received signal intensity is equal to or less than the threshold (Yes at step S6), the determination unit 2 calculates the inclination of the straight line that approximates the transition of the received signal intensity (step S7). For example, the straight line that approximates the transition of the received signal intensity is a straight line that approximates a plurality of measured values of the received signal intensity using a least-squares method. Moreover, for example, the straight line that approximates the transition of the received signal intensity is a straight line that connects the latest received signal intensity with the second latest received signal intensity. Furthermore, for example, the transition of the received signal intensity may be approximated to a straight line by a plurality of methods, and the determination may be made by combining the inclinations obtained from a plurality of the straight lines.

Next, the determination unit 2 determines whether the inclination calculated by the process at step S7 is negative (step S8). When the inclination is negative (Yes at step S8), the determination unit 2 determines to switch the connection to the connection destination to connection to another connection destination (step S9). On the other hand, when the inclination is positive or zero (No at step S8), the determination unit 2 determines to maintain the connection to the connection destination (step S10).

Finally, the communication control unit 1 controls communication according to the determination result (step S9 to step S12) of the determination unit 2.

It is to be noted that the processes at step S7 and step S8 described above may be omitted. More specifically, when the transmission and reception information is equal to or more than a threshold (first threshold), and the variation is equal to or less than a threshold (second threshold), the determination unit 2 may switch the connection to the connection destination (first wireless communication device) to connection to another connection destination (second wireless communication device).

As described above, in the wireless communication device 10 in the first embodiment, the communication control unit 1 transmits and receives data to and from the connection destination (first wireless communication device). The determination unit 2 calculates the transmission and reception information on the basis of the transmission and reception result of data, and the variation of the received signal intensity of data. The determination unit 2 then determines whether to maintain the connection to the first wireless communication device, on the basis of the transmission and reception information and the variation. The communication control unit 1 controls communication according to the determination result of the determination unit 2.

The wireless communication device 10 in the first embodiment predicts the magnitude of time variation of the propagation path, by using the characteristic amount (for example, variation) calculated using the past received signal intensity from the connection destination. Consequently, with the wireless communication device 10 in the first embodiment, it is possible to more suitably determine whether to maintain or switch the connection destination, in an environment with different magnitude of time variation of the propagation path.

Second Embodiment

Next, a second embodiment will be described. In the second embodiment, description similar to that of the first embodiment will be omitted.

Example of Functional Configuration

Figure 5:
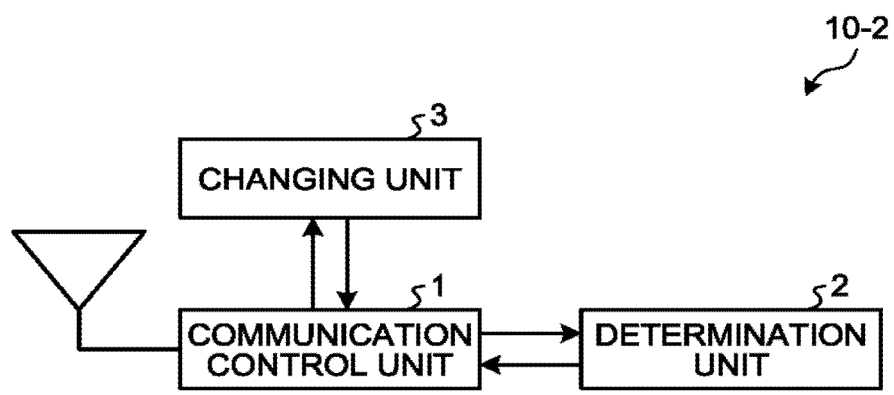
FIG. 5 is a diagram illustrating an example of a functional configuration of a wireless communication device in a second embodiment.

FIG. 5 is a diagram illustrating an example of a functional configuration of a wireless communication device 10-2 in a second embodiment. The wireless communication device 10-2 in the second embodiment includes the communication control unit 1, the determination unit 2, and a changing unit 3. The changing unit 3 is added in the second embodiment.

The changing unit 3 changes the length of a period (predetermined period) for referring the transmission and reception result of data, when the transmission and reception information described above is to be calculated. For example, when the number of times communication has successively failed is equal to or more than a threshold (third threshold), the changing unit 3 shortens the predetermined period by a predetermined decrement amount. Moreover, for example, when the number of times communication has successively succeeded is equal to or more than a threshold (fourth threshold), the changing unit 3 increases the predetermined period by a predetermined increment amount.

When the predetermined period is changed, the communication control unit 1 supplies the transmission and reception result of data as much as a new predetermined period transmitted and received to and from the connection destination, to the determination unit 2.

Example of Operation Method

Figure 6:
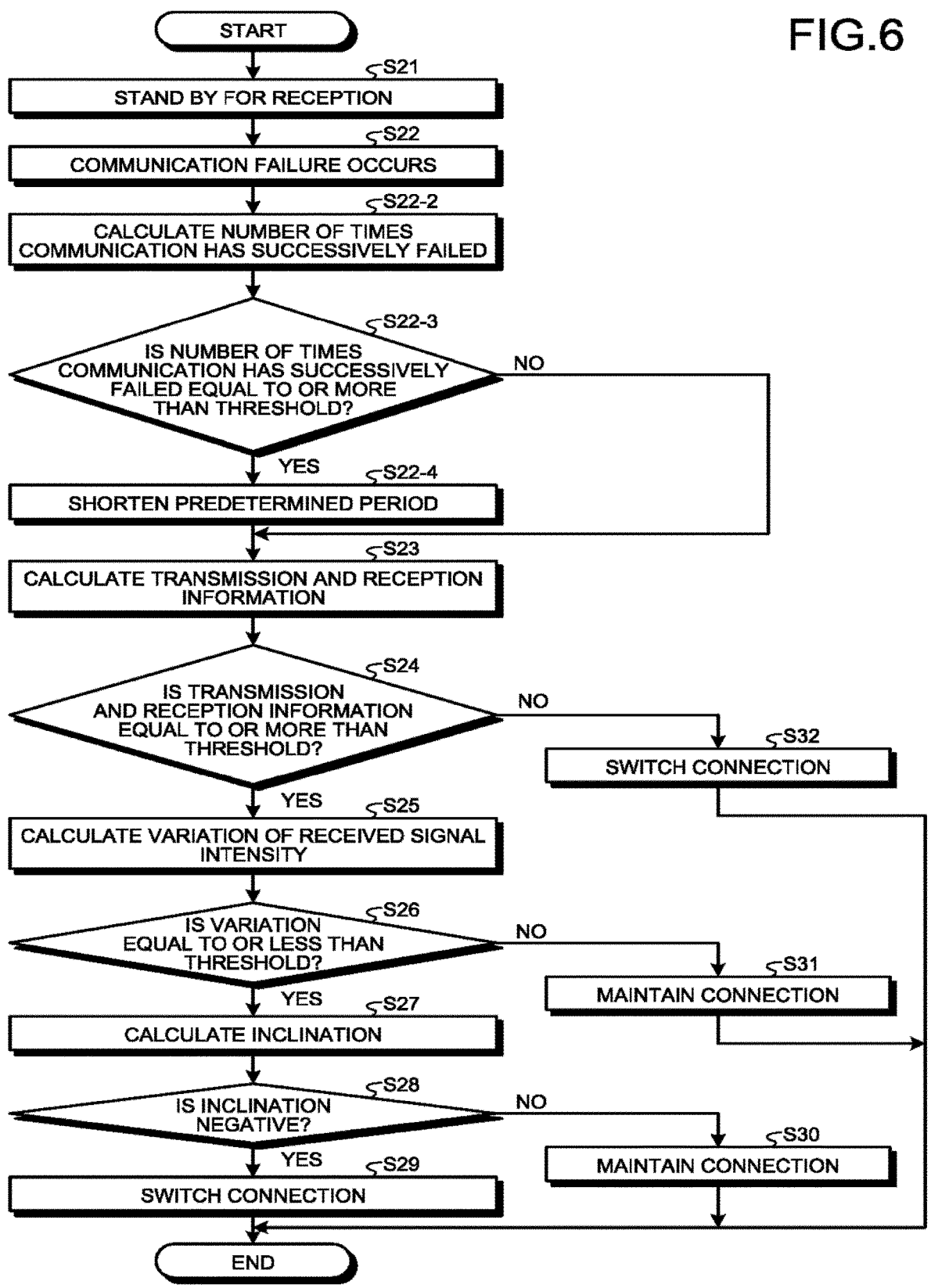
FIG. 6 is a flowchart illustrating an example of an operation method of the wireless communication device in the second embodiment.

FIG. 6 is a flowchart illustrating an example of an operation method of the wireless communication device 10-2 in the second embodiment. Because steps S21 and S22, and steps S23 to S32 are the same as steps S1 and S2, and steps S3 to S12 in FIG. 4 described above, the description thereof is omitted.

The determination unit 2 calculates the number of times communication has successively failed (step S22-2). More specifically, the determination unit 2 calculates the number of times communication has successively failed, by receiving transmission data information of the parent node and information indicating success or failure of communication, received from the communication control unit 1.

Next, the determination unit 2 determines whether the number of times communication has successively failed is equal to or more than a threshold (step S22-3). When the number of times communication has successively failed is smaller than a threshold (No at step S22-3), the process proceeds to step S23.

When the number of times communication has successively failed is equal to or more than the threshold (Yes at step S22-3), the determination unit 2 shortens the predetermined period by a predetermined decrement amount (step S22-4). For example, the predetermined decrement amount is a single communication cycle of the wireless communication device 10.

For example, the threshold used in the determination process at step S22-3 is a value set in advance that is read when the wireless communication device 10 is activated. Moreover, for example, the threshold used in the determination process at step S22-3 is a value notified by the aggregation device 20. Furthermore, for example, the threshold used in the determination process at step S22-3 is the resending upper limit times of the wireless communication device 10 from the aggregation device 20. Still furthermore, for example, the threshold used in the determination process at step S22-3 is the remaining resending upper limit times of the oldest data to be transmitted held in the wireless communication device 10.

In the flowchart in FIG. 6 described above, as an example of changing the predetermined period, the predetermined period is shortened as much as a single communication cycle of the wireless communication device 10. However, the method of changing the predetermined period is not limited thereto.

In addition to the contents explained in the first embodiment described above, a new predetermined period set and changed by the changing unit 3 may also include a period shorter than the set predetermined period, a period longer than the set predetermined period, a period obtained by subtracting the elapsed period during which the wireless communication device 10 switches the connection destination from the set predetermined period, a period obtained by adding the elapsed period during which the wireless communication device 10 switches the connection destination to the set predetermined period, a period longer than the set predetermined period by n communication cycle (n is an integer equal to or more than one), or a period shorter than the set predetermined period by n communication cycle (n is an integer equal to or more than one).

When communication has successively failed, it is assumed that the connection destination does not have a good communication quality. Consequently, the period to evaluate the past received signal intensity is shortened. Thus, the data acquired before communication has successively failed is removed from an object to be evaluated, and is evaluated by data that more includes the repeated communication failure with the connection destination. Hence, it is expected to improve the possibility of determining to switch the connection destination. In contrast, when communication has successively succeeded, the period to evaluate the past received signal intensity in increased, and the determination is made based on more data. Consequently, it is expected to improve the accuracy of determination.

The determination process at step S22-3 described above may also be performed by using the other method. For example, the determination unit 2 may also determine the number of times determination that the connection to the connection destination is to be maintained is made, and the number of times determination that the connection to the connection destination is to be switched is made. In this case, when the number of times determination that the connection destination is to be switched is made is equal to or more than a threshold (third threshold), the changing unit 3 shortens the predetermined period by a predetermined decrement amount. When the number of times determination that the connection destination is to be maintained is made is equal to or more than a threshold (fourth threshold), the changing unit 3 increases the predetermined period by a predetermined increment amount.

Moreover, for example, the determination unit 2 may also determine the immediately preceding determination result (connection/switch). In this case, when the determination unit 2 determines to switch the connection destination, the changing unit 3 shortens the predetermined period by a predetermined decrement amount. When the determination unit 2 determines to maintain the connection destination, the changing unit 3 increases the predetermined period by a predetermined increment amount.

As described above, with the wireless communication device 10-2 of the second embodiment, it is possible to determine whether to maintain or switch connection by using the data in a suitable predetermined period, according to the connection state to the wireless communication device 10. There is a problem in that the characteristics of the propagation path cannot evaluate, when the data acquisition period is longer or shorter than necessary. However, with the wireless communication device 10-2 of the second embodiment, it is possible to use data in a suitable predetermined period. Consequently, it is possible to evaluate the characteristics of the propagation path more accurately.

Third Embodiment

Next, a third embodiment will be described. In the third embodiment, description similar to that of the first embodiment will be omitted.

Example of Functional Configuration

Figure 7:
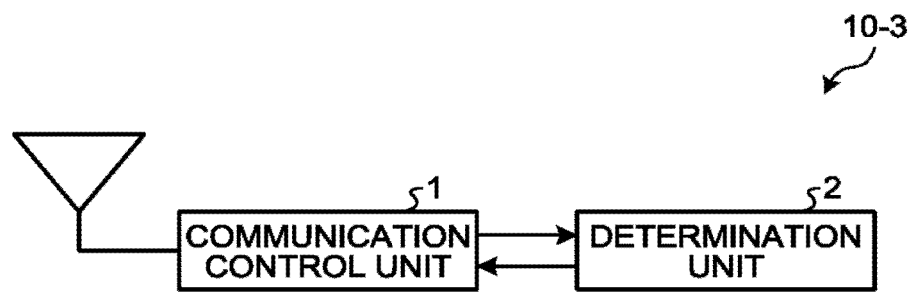
FIG. 7 is a diagram illustrating an example of a functional configuration of a wireless communication device in a third embodiment.

FIG. 7 is a diagram illustrating an example of a functional configuration of a wireless communication device 10-3 in a third embodiment. The wireless communication device 10-3 in the third embodiment includes the communication control unit 1 and the determination unit 2.

The determination unit 2 in the third embodiment determines whether the number of pieces of received data received from the connection destination is equal to or more than a threshold (fifth threshold), before determining the variation of the received signal intensity.

Example of Operation Method

Figure 8:
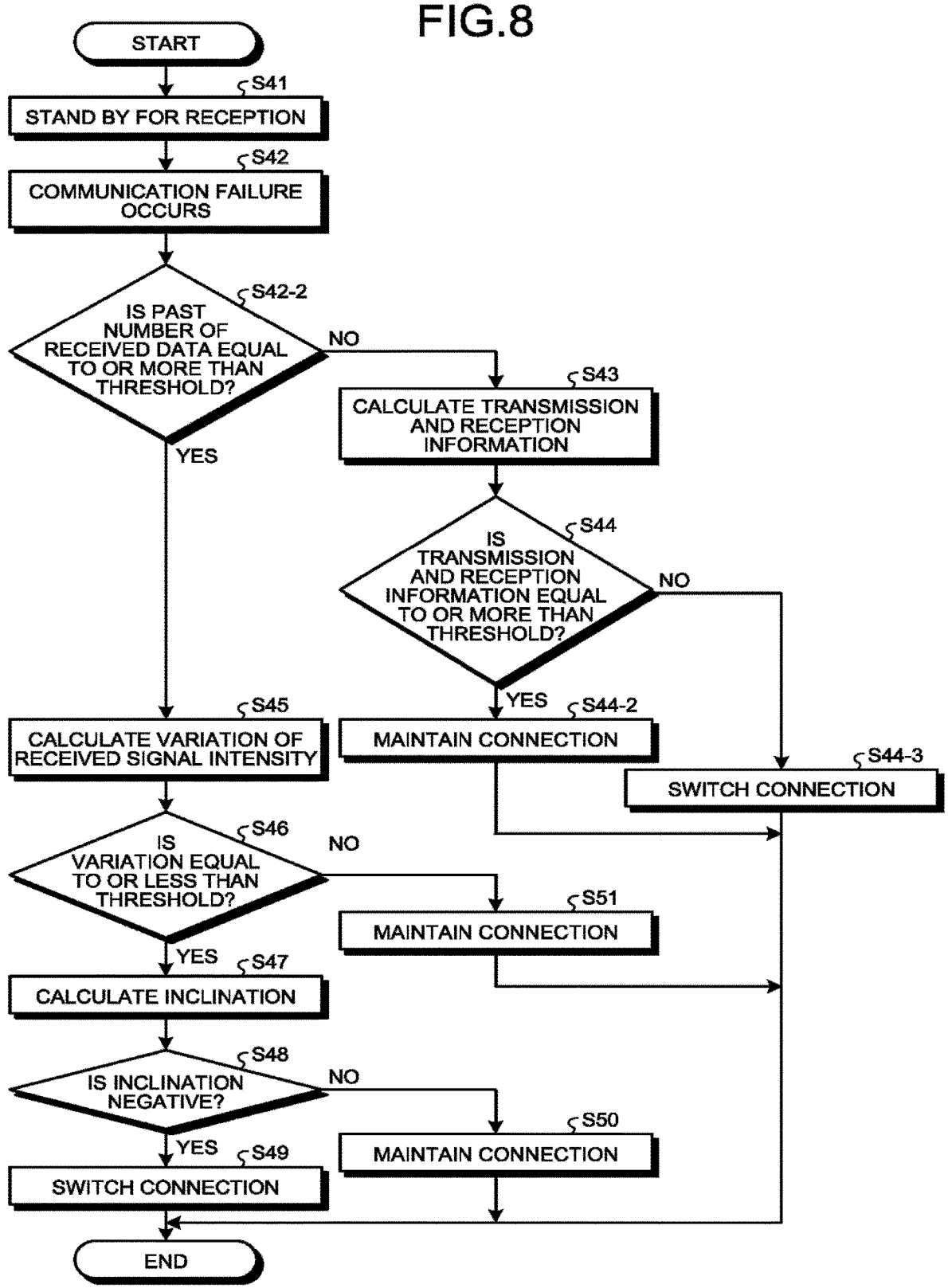
FIG. 8 is a flowchart illustrating an example of an operation method of the wireless communication device in the third embodiment.

FIG. 8 is a flowchart illustrating an example of an operation method of the wireless communication device 10-3 in the third embodiment. Because steps S41 and S42, and steps S45 to S51 are the same as steps S1 and S2, and steps S5 to S11 in FIG. 4 described above, the description thereof is omitted.

When a communication failure occurs with the connection destination in the communication control unit 1 (step S42), the determination unit 2 calculates the number of pieces of successfully received data with respect to the past received data that is received within a predetermined period, and determines whether the number of pieces of received data is equal to or more than a threshold (step S42-2). In this process, the determination unit 2 may also calculate the number of pieces of successfully received data when communication is successful, instead of calculating the number of pieces of successfully received data when a communication failure has occurred.

For example, the threshold used in the determination process at step S42-2 is the number of pieces of data, a transmission and reception success rate, and the like that are set in advance and that are read when the wireless communication device 10 is activated (when power is turned ON). Moreover, for example, the threshold used in the determination process at step S42-2 is the number of pieces of data notified by the aggregation device 20, the transmission and reception success rate, and the like.

When the number of pieces of received data is equal to or more than the threshold (Yes at step S42-2), the process proceeds to step S45.

When the number of pieces of received data is less than the threshold (No at step S42-2), the determination unit 2 calculates the transmission and reception information (step S43). Next, the determination unit 2 determines whether the transmission and reception information described above is equal to or more than a threshold (first threshold) (step S44). When the reception information is equal to or more than the threshold (Yes at step S44), the determination unit 2 determines to maintain the connection to the connection destination (step S44-2). When the transmission and reception information is less than the threshold (No at step S44), the determination unit 2 determines to switch the connection to the connection destination, to connection to another connection destination (step S44-3).

Finally, the communication control unit 1 controls communication according to the determination result (step S49 to step S51, and step S44-2 or step S44-3) of the determination unit 2.

As described above, in the wireless communication device 10-3 in the third embodiment, the data transmission and reception amount, the variation, and the inclination are evaluated after the number of pieces of received data is evaluated. More specifically, the determination control of the wireless communication device 10-3 in the third embodiment is separately carried out in a case when it is possible to accurately evaluate by the variation and inclination, because of the sufficient number of pieces of data (the number of pieces of received data is equal to or more than a threshold); and in a case when it is not possible to evaluate by the variation and inclination, and the evaluation by the transmission and reception information is required, because of insufficient data (the number of pieces of received data is less than a threshold). Consequently, it is possible to improve the accuracy of determination according to the magnitude of time variation of the propagation path.

Fourth Embodiment

Next, a fourth embodiment will be described. In the fourth embodiment, description similar to that of the first embodiment will be omitted.

Example of Functional Configuration

Figure 9:
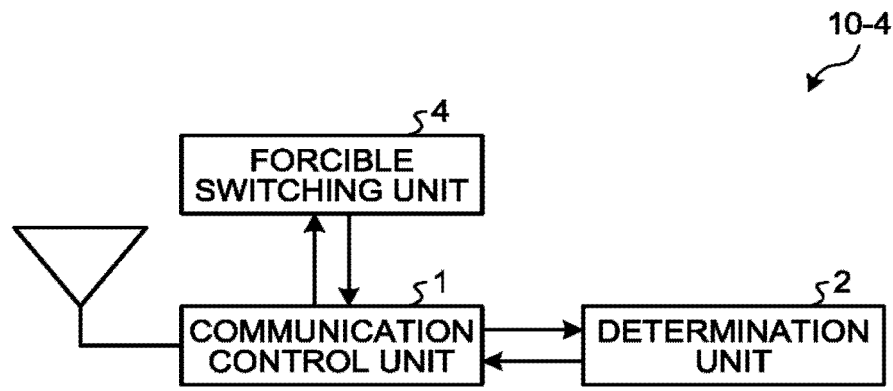
FIG. 9 is a diagram illustrating an example of a functional configuration of a wireless communication device in a fourth embodiment.

FIG. 9 is a diagram illustrating an example of a functional configuration of a wireless communication device 10-4 in a fourth embodiment. The wireless communication device 10-4 in the fourth embodiment includes the communication control unit 1, the determination unit 2, and a forcible switching unit 4.

When the connection to the first wireless connection device is maintained for a predetermined connection period, the forcible switching unit 4 switches the connection to the connection destination (first wireless connection device) to connection to another connection destination (second wireless communication device).

Example of Operation Method

Figure 10:
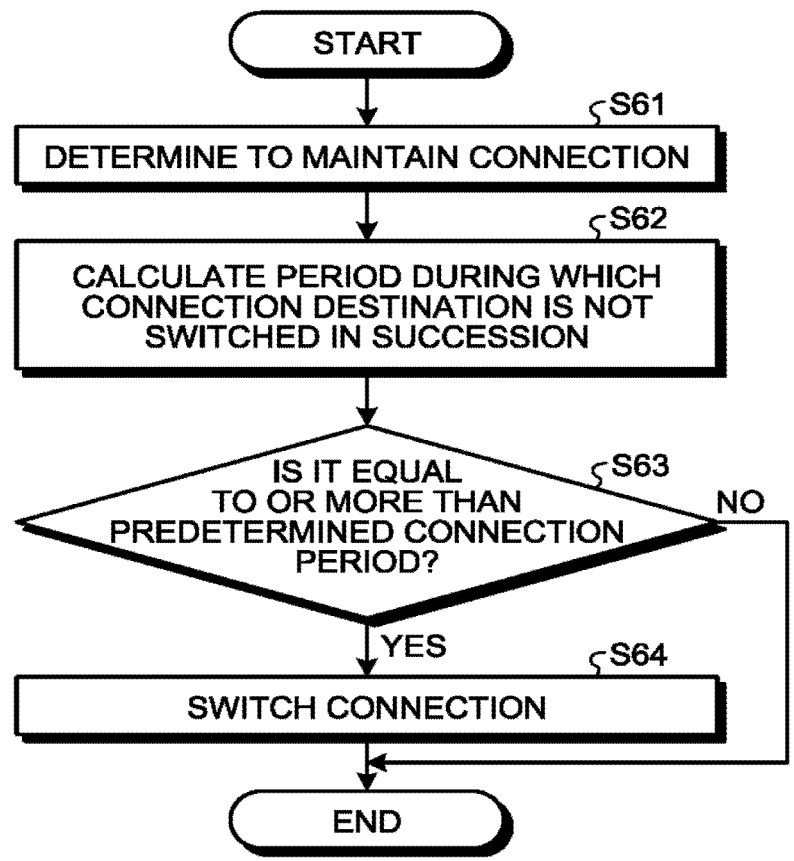
FIG. 10 is a flowchart illustrating an example of an operation method of the wireless communication device in the fourth embodiment.

FIG. 10 is a flowchart illustrating an example of an operation method of the wireless communication device 10-4 in the fourth embodiment. First, the determination unit 2 determines to maintain the connection to the connection destination (step S61), and supplies the determination result to the forcible switching unit 4. Next, upon receiving the determination result indicating that the connection to the connection destination is to be maintained from the determination unit 2, the forcible switching unit 4 calculates a period during which the connection is not switched in succession (step S62).

Next, the forcible switching unit 4 determines whether the period during which the connection is not switched in succession (a period during which the connection is not switched at all) is equal to or more than a predetermined connection period (step S63). In this process, for example, the predetermined connection period is a value set in advance that is read when the wireless communication device 10 is activated (when power is turned ON). For example, the predetermined connection period may also be a value notified by the aggregation device 20.

When the value is smaller than the predetermined connection period (No at step S63), the process is finished.

When the value is equal to or more than the predetermined connection period (Yes at step S63), the forcible switching unit 4 switches the connection to the connection destination to connection to another connection destination (step S64). More specifically, the forcible switching unit 4 instructs the communication control unit 1 to perform a search process for searching a new connection destination. Upon receiving the instruction for performing the search process from the forcible switching unit 4, the communication control unit 1 performs the search process for searching a new connection destination.

The forcible switching unit 4 may also instruct the communication control unit 1 to perform the search process for searching a new connection destination, when the number of communication failure is equal to or more than a threshold. For example, this threshold is a value set in advance that is read when the wireless communication device 10 is activated (when power is turned ON). Moreover, for example, this threshold is a value notified by the aggregation device 20.

As described above, with the wireless communication device 10-4 of the fourth embodiment, when the connection to the connection destination is to be maintained, it is possible to improve the communication quality with the wireless communication devices 10-4, by causing the communication control unit 1 to search for a connection destination with better communication quality, within a range in which the power saving performance will not be deteriorated.

Finally, examples of a hardware configuration of the wireless communication device 10 (10-2, 10-3, and 10-4) and the aggregation device 20 in the first to fourth embodiments will be described.

First Example of Hardware Configuration

Figure 11:
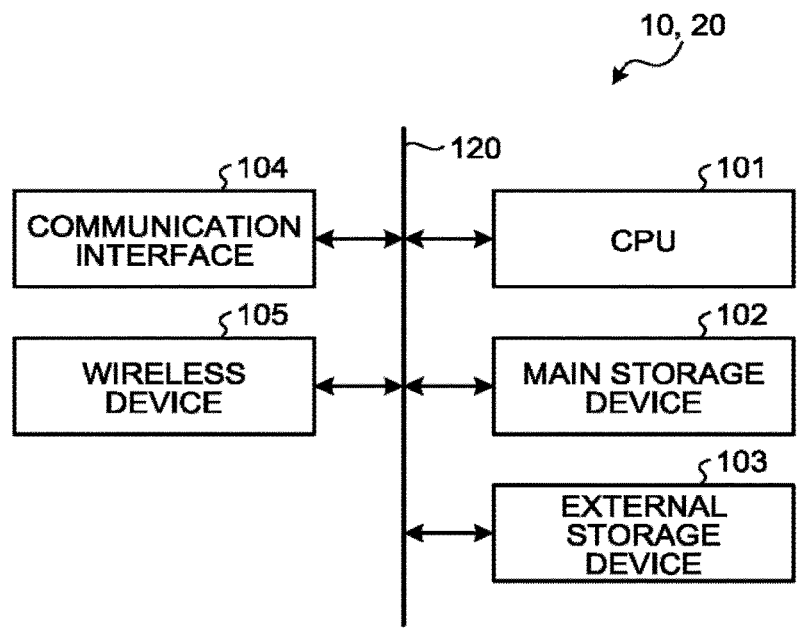
FIG. 11 is a diagram illustrating a first example of a hardware configuration of the wireless communication device and an aggregation device in the first to fourth embodiments.

FIG. 11 is a diagram illustrating a first example of a hardware configuration of the wireless communication device 10 (10-2, 10-3, and 10-4) and the aggregation device 20 in the first to fourth embodiments. In the first example in FIG. 11, the wireless communication device 10 and the aggregation device 20 include a central processing unit (CPU) 101, a main storage device 102, an external storage device 103, a communication interface 104, and a wireless device 105. The CPU 101, the main storage device 102, the external storage device 103, the communication interface 104, and the wireless device 105 are connected by a bus 120.

The CPU 101 reads out a computer program from a storage medium such as the external storage device 103, and executes the computer program on the main storage device 102.

The main storage device 102 stores therein a computer program, data required for executing the computer program, data generated by executing the computer program, and the like. The main storage device 102 is optional. For example, the main storage device 102 is a random access memory (RAM), a dynamic random access memory (DRAM), a static random access memory (SRAM), and the like.

The main storage device 102 stores therein information such as a computer program and data. For example, the data is data received from another node (for example, sensor data acquired by another node, and the like).

Moreover, the main storage device 102 may also store therein information on an operating system (OS), a basic input output system (BIOS), various types of middleware, and the like.

The external storage device 103 stores therein a computer program, data required for executing the computer program, data generated by executing the computer program, and the like. The computer program and data are developed on the main storage device 102, when the computer program is executed. The external storage device 103 is optional. For example, the external storage device 103 is a hard disk, an optical disc, a flash memory, a magnetic tape, and the like.

For example, the computer program executed by the wireless communication device 10 and the aggregation device 20 may be installed in the external storage device 103 in advance. Moreover, for example, the computer program may be installed in the external storage device 103, when the external storage device 103 stores the computer program transmitted to the aggregation device 20 from another device through another wired or wireless network.

The communication interface 104 is a general interface (I/F) for communicating with an external device. For example, the communication interface 104 is a universal asynchronous receiver-transmitter (UART), an inter-integrated circuit (I2C), a serial peripheral interface (SPI), a controller area network (CAN), a recommended standard 232 (RS232), an Ethernet (registered trademark) port, and the like.

The wireless device 105 is a device used when the wireless communication device 10 and the aggregation device 20 perform wireless communication with another device. The wireless communication device 10 and the aggregation device 20 may also include a plurality of the wireless devices 105.

Next, a second example of the hardware configuration of the wireless communication device 10 and the aggregation device 20 of the embodiments will be described.

Second Example of Hardware Configuration

Figure 12:
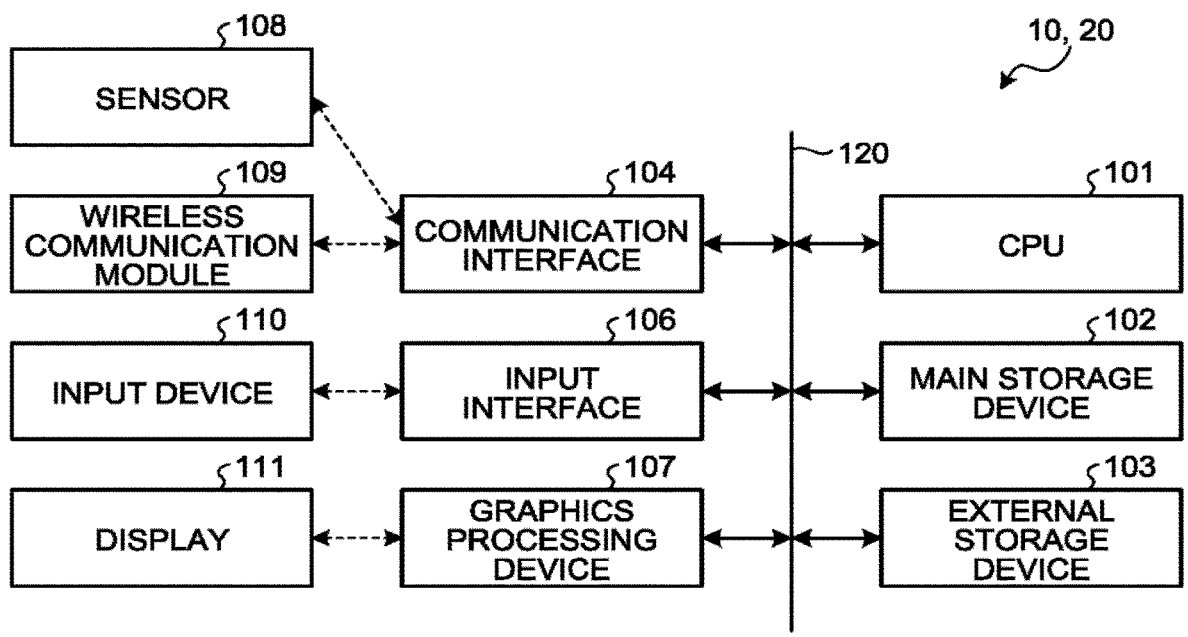
FIG. 12 is a diagram illustrating a second example of a hardware configuration of the wireless communication device and the aggregation device in the first to fourth embodiments.

FIG. 12 is a diagram illustrating a second example of a hardware configuration of the wireless communication device 10 (10-2, 10-3, and 10-4) and the aggregation device 20 in the first to fourth embodiments. In the second example in FIG. 12, the wireless communication device 10 and the aggregation device 20 include the CPU 101, the main storage device 102, the external storage device 103, the communication interface 104, an input interface 106, and a graphics processing device 107. The CPU 101, the main storage device 102, the external storage device 103, the communication interface 104, the input interface 106, and the graphics processing device 107 are connected via the bus 120.

Moreover, in the second example in FIG. 12, a sensor 108 and a wireless communication module 109 are connected to the communication interface 104. An input device 110 is connected to the input interface 106. Moreover, a display 111 is connected to the graphics processing device 107.

Because the CPU 101, the main storage device 102, the external storage device 103, and the communication interface 104 are the same as those in FIG. 11 described above, the description thereof is omitted.

The input interface 106 receives an operation signal according to the input operation received by the input device 110 from the input device 110. The input device 110 is optional. For example, the input device 110 is a keyboard, a mouse, or the like.

The graphics processing device 107 is a device that causes the display 111 to display a video or an image, on the basis of a video signal and an image signal generated by the CPU 101. The display 111 is optional. For example, the display 111 is a liquid crystal display (LCD), a cathode-ray tube (CRT), a plasma display panel (PDP), and the like.

The sensor 108 is optional. For example, the sensor 108 is an illuminance sensor, a temperature and humidity sensor, an acceleration sensor, an angular velocity sensor, and the like. The sensor 108 may also be a pseudo sensor. For example, the pseudo sensor is another computer device that outputs data. Because the aggregation device 20 is a device for aggregating data from the wireless communication device 10, the aggregation device 20 may not include the sensor 108.

The wireless communication module 109 plays a role of the wireless device 105 in FIG. 11 described above. The hardware configuration of the wireless communication module 109 need not be the same as that of the wireless device 105 described above. Moreover, similar to the wireless device 105 in FIG. 11, the wireless communication device 10 and the aggregation device 20 may also include a plurality of the wireless communication modules 109.

The power source of the hardware in FIG. 11 and FIG. 12 described above is optional. For example, the power source of the hardware in FIG. 11 and FIG. 12 described above may be a battery, a generator, a power generation module, a commercial power source, and the like.

However, because the power source of the wireless communication device 10 concerns the power saving performance of the wireless communication device 10, it is assumed that the wireless communication device 10 is mainly driven by energy supplied from a battery, a power generation element, and the like. However, even when the power source of the wireless communication device 10 is the commercial power source, it is possible to suppress the consumption power by the wireless communication method in the first to fourth embodiments described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device comprising:
    a memory; and
    one or more hardware processors coupled to the memory and configured to function as:
    a communication control unit that transmits and receives data to and from a first wireless communication device; and
    a determination unit that calculates transmission and reception information based on a transmission and reception result of the data, and variation of received signal intensity of the data, and that determines whether to maintain connection to the first wireless device based on the transmission and reception information and the variation, wherein
    when the transmission and reception information is less than a first threshold, the determination unit determines to switch the connection to the first wireless communication device to connection to a second wireless communication device, and when the transmission and reception information is equal to or more than the first threshold, and the variation is larger than a second threshold, the determination unit determines to maintain the connection to the first wireless communication device, and
    the communication control unit controls communication according to a determination result of the determination unit.

2. The device according to claim 1, wherein when the transmission and reception information is equal to or more than the first threshold, and the variation is equal to or less than the second threshold, the determination unit determines to switch the connection to the first wireless communication device to the connection to the second wireless communication device.

3. The device according to claim 1, wherein
    when the transmission and reception information is equal to or more than the first threshold, and the variation is equal to or less than the second threshold, the determination unit calculates inclination of a straight line that approximates transition of the received signal intensity, when the inclination is positive or zero, the determination unit determines to maintain the connection to the first wireless communication device, and when the inclination is negative, the determination unit determines to switch the connection to the first wireless communication device to the connection to the second wireless communication device.

4. The device according to claim 3, wherein the variation is one of a sum of squared errors of the straight line that approximates the transition of the received signal intensity and the respective received signal intensity, a standard deviation of the received signal intensity, dispersion of the received signal intensity, and amplitude of the received signal intensity.

5. The device according to claim 4, wherein the straight line that approximates the transition of the received signal intensity is a straight line that connects latest received signal intensity with second latest received signal intensity.

6. The device according to claim 3, wherein the determination unit calculates the transmission and reception information, the variation, and the inclination based on data transmitted and received to and from the first wireless communication device within a predetermined period.

7. The device according to claim 6, wherein the predetermined period is
- a resending upper limit period that indicates a period during which the wireless communication device can continue resending data to be transmitted from when the data to be transmitted is generated,
- a period until a buffer overflow occurs, when data to be transmitted is accumulated in a buffer that holds data to be transmitted in the wireless communication device, at every communication cycle,
- a remaining resending period that indicates a period until data that has continued to be resent for a longest time, in data to be transmitted held in the wireless communication device, reaches the resending upper limit period,
- a transmission period required for transmitting data that has continued to be resent for a longest time, in the data to be transmitted held in the wireless communication device, a transmission period required for transmitting entire data to be transmitted held in the wireless communication device,
- a period obtained by subtracting a period until data transmitted to the first wireless communication device reaches an aggregation device, from the resending upper limit period,
- a period obtained by subtracting the period until the data transmitted to the first wireless communication device reaches the aggregation device, from the period until the buffer overflow occurs,
- a period obtained by subtracting the period until the data transmitted to the first wireless communication device reaches the aggregation device, from the remaining resending period,
- a period obtained by subtracting the period until the data transmitted to the first wireless communication device reaches the aggregation device, from the transmission period required for transmitting the data that has continued to be resent for the longest time, or
- a period obtained by subtracting the period until the data transmitted to the first wireless communication device reaches the aggregation device, from the transmission period required for transmitting the entire data to be transmitted.

8. The device according to claim 6, further comprising a changing unit that when a number of times communication has successively failed is equal to or more than a third threshold, shortens the predetermined period by a predetermined decrement amount, and that when a number of times communication has successively succeeded is equal to or more than a fourth threshold, increases the predetermined period by a predetermined increment amount.

9. The device according to claim 6, further comprising a changing unit that when a number of times determination that a connection destination is to be switched is made is equal to or more than a third threshold, shortens the predetermined period by a predetermined decrement amount; and that when a number of times determination that a connection destination is to be maintained is made is equal to or more than a fourth threshold, increases the predetermined period by a predetermined increment amount.

10. The device according to claim 6, further comprising a changing unit that when the determination unit determines to switch a connection destination, shortens the predetermined period by a predetermined decrement amount, and that when the determination unit determines to maintain a connection destination, increases the predetermined period by a predetermined increment amount.

11. The device according to claim 1, wherein the transmission and reception information includes at least one of a number of times the data is received, a reception success rate of the data, a reception amount of the data, a number of times the data is transmitted, a transmission success rate of the data, a transmission amount of the data, and throughput of connection to the first wireless communication device.

12. The device according to claim 1, wherein the first threshold is one of
- a predetermined transmission data amount,
- a predetermined reception data amount,
- a predetermined number of times of transmission,
- a predetermined number of times of reception,
- a value obtained by dividing the predetermined number of times of transmission by a number of times of transmission until a resending upper limit period,
- a value obtained by dividing the predetermined number of times of transmission by a number of times of transmission until a buffer overflow occurs, and
- throughput required for transmitting an entire data amount to be transmitted held in the wireless communication device in a predetermined transmission cycle.

13. The device according to claim 1, wherein when a number of pieces of reception data received from a connection destination is equal to or more than a fifth threshold, the determination unit determines whether to maintain the connection to the first wireless communication device based on the variation, and when the number of pieces of reception data is less than the fifth threshold, the determination unit determines whether to maintain the connection to the first wireless communication device based on the transmission and reception information.

14. The device according to claim 1, further comprising a forcible switching unit that when the connection to the first wireless communication device is maintained for a predetermined connection period, switches the connection to the first wireless communication device to the connection to the second wireless communication device.

15. A wireless communication system comprising:
an aggregation device that aggregates data, and
a plurality of wireless communication devices, wherein
the aggregation device and the wireless communication devices are connected to a network,
each of the wireless communication devices includes:
- a communication control unit that transmits and receives data to and from a first wireless communication device; and
- a determination unit that calculates transmission and reception information based on a transmission and reception result of the data, and variation of received signal intensity of the data, and that determines whether to maintain connection to the first wireless communication device based on the transmission and reception information and the variation, and when the transmission and reception information is less than a first threshold, the determination unit determines to switch the connection to the first wireless communication device to connection to a second wireless communication device, and when the transmission and reception information is equal to or more than the first threshold, and the variation is larger than a second threshold, the determination unit determines to maintain the connection to the first wireless communication device, and the communication control unit controls communication according to a determination result of the determination unit.

16. A computer program product having a non-transitory computer readable medium including programmed instructions, wherein the instructions, when executed by a computer, cause the computer to function as:
- a communication control unit that transmits and receives data to and from a first wireless communication device; and
- a determination unit that calculates transmission and reception information based on a transmission and reception result of the data, and variation of received signal intensity of the data, and that determines whether to maintain connection to the first wireless communication device based on the transmission and reception information and the variation, wherein when the transmission and reception information is less than a first threshold, the determination unit determines to switch the connection to the first wireless communication device to connection to a second wireless communication device, and when the transmission and reception information is equal to or more than the first threshold, and the variation is larger than a second threshold, the determination unit determines to maintain the connection to the first wireless communication device, and the communication control unit controls communication according to a determination result of the determination unit.

* * * * *